US012790945B2

(12) United States Patent
Danno et al.

(10) Patent No.: US 12,790,945 B2
(45) Date of Patent: Nov. 10, 2026

(54) STEAM TURBINE BLADE, STEAM TURBINE, AND METHOD FOR MANUFACTURING STEAM TURBINE BLADE

(71) Applicant: MITSUBISHI HEAVY INDUSTRIES, LTD., Tokyo (JP)

(72) Inventors: Shohei Danno, Tokyo (JP); Soichiro Tabata, Tokyo (JP); Hideaki Sato, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 0 days.

(21) Appl. No.: 19/109,739

(22) PCT Filed: Oct. 31, 2023

(86) PCT No.: PCT/JP2023/039208

§ 371 (c)(1),
(2) Date: Mar. 7, 2025

(87) PCT Pub. No.: WO2024/101217

PCT Pub. Date: May 16, 2024

(65) Prior Publication Data

US 2026/0078675 A1 Mar. 19, 2026

(30) Foreign Application Priority Data

Nov. 11, 2022 (JP) ................................ 2022-181285

(51) Int. Cl.

| | |
|---|---|
| ***F01D 5/14*** | (2006.01) |
| ***F01D 9/02*** | (2006.01) |
| ***F01D 25/32*** | (2006.01) |

(52) U.S. Cl.

CPC ............... *F01D 5/141* (2013.01); *F01D 9/02* (2013.01); *F01D 25/32* (2013.01); *F05D 2220/31* (2013.01)

(58) Field of Classification Search

CPC . F01D 5/141; F01D 9/02; F01D 25/32; F05D 2220/31

See application file for complete search history.

(56) References Cited

U.S. PATENT DOCUMENTS 1,862,827 A * 6/1932 Quintin .................. F01D 5/146 415/168.1
4,720,239 A * 1/1988 Owczarek .............. F01D 5/141 415/181

(Continued)

FOREIGN PATENT DOCUMENTS

GB 2424454 A 9/2006
JP S64-080705 A 3/1989

(Continued)

OTHER PUBLICATIONS

International Search Report dated Dec. 26, 2023, issued in counerpart Application No. PCT/JP2023/039208. (12 pages).

(Continued)

*Primary Examiner* — Eldon T Brockman
(74) *Attorney, Agent, or Firm* — WHDA, LLP

(57) ABSTRACT

A steam turbine blade according to at least one embodiment of the present disclosure comprises: a recess part formed in the surface of the blade; a liquid-phase guiding member that is inserted in and fixed to the recess part, and that either has a hydrophilic coating provided thereon or has, on the surface thereof, projections and recesses for guiding liquid-phase water to the rear edge side of the blade; and a through-hole for taking, into an internal space of the blade, the liquid-phase water guided by the liquid-phase guiding member.

13 Claims, 13 Drawing Sheets

(56) References Cited

U.S. PATENT DOCUMENTS

| | | | | |
|---|---|---|---|---|
| 9,745,866 | B2 * | 8/2017 | Nakano | F01D 9/02 |
| 10,781,722 | B2 * | 9/2020 | Fandrei, II | B23K 26/0624 |
| 11,840,938 | B2 * | 12/2023 | Takata | F01D 25/00 |
| 12,221,900 | B2 * | 2/2025 | Duan | F01D 9/02 |
| 2007/0014670 | A1 * | 1/2007 | Maeno | B23P 15/04 416/232 |
| 2007/0031639 | A1 * | 2/2007 | Hsu | C23C 8/24 428/141 |
| 2014/0030065 | A1 | 1/2014 | Nakano et al. | |
| 2017/0167301 | A1 * | 6/2017 | Fandrei, II | B23K 26/0624 |
| 2022/0381157 | A1 | 12/2022 | Mizumi et al. | |
| 2023/0003143 | A1 | 1/2023 | Senoo et al. | |
| 2023/0243273 | A1 | 8/2023 | Takata et al. | |

FOREIGN PATENT DOCUMENTS

| | | | | |
|---|---|---|---|---|
| JP | H01-110812 | A | | 4/1989 |
| JP | 11210404 | A | * | 8/1999 |
| JP | 2007-23895 | A | | 2/2007 |
| JP | 2014-25443 | A | | 2/2014 |
| JP | 2017-106451 | A | | 6/2017 |
| JP | 2021-161962 | A | | 10/2021 |
| JP | 2021-181773 | A | | 11/2021 |
| WO | 2019/117752 | A1 | | 6/2019 |
| WO | 2021/117883 | A1 | | 6/2021 |

OTHER PUBLICATIONS

Notification of Transmittal of Translation of the International Preliminary Report on Patentability (Form PCT/IB/338) issued in counterpart International Application No. PCT/JP2023/039208 mailed May 22, 2025 with Forms PCT/IB/373, PCT/ISA/237 and PCT/IB/326, with English translation. (16 pages).

* cited by examiner

A-A

B-B

D-D

STEAM TURBINE BLADE, STEAM TURBINE, AND METHOD FOR MANUFACTURING STEAM TURBINE BLADE

TECHNICAL FIELD

The present disclosure relates to a steam turbine blade, a steam turbine, and a method for manufacturing a steam turbine blade.

The present application claims priority based on Japanese Patent Application No. 2022-181285 filed in Japan on Nov. 11, 2022, the contents of which are incorporated herein by reference.

BACKGROUND ART

Steam passing through a steam turbine loses energy from an upstream side to a downstream side, and a temperature and pressure thereof decrease. Therefore, in a downstream stage of the steam turbine, some of the steam is condensed into fine water droplets and exists in an air flow, and some of the water droplets adhere to a surface of a turbine stator blade and immediately grows on the blade surface to form a liquid film. In a case where the liquid film further grows and becomes thicker, a part of the liquid film is tom by a vapor flow and scatters in the form of coarse liquid droplets. In a case where the scattered liquid droplets collide with a turbine rotor blade, rotation of the turbine rotor blade may be hindered, and thus a braking loss may occur or erosion may occur.

Therefore, for example, a fine slit that connects an inner space inside the stator blade with the outside of the stator blade is formed on a blade surface of a hollow stator blade, and moisture (liquid phase) adhering to a surface of the stator blade is sucked into the inner space through the slit by a pressure difference, thereby suppressing the scattering of liquid droplets (see, for example, PTL 1).

CITATION LIST

Patent Literature

[PTL 1] Japanese Unexamined Patent Application Publication No. 2021-181773

SUMMARY OF INVENTION

Technical Problem

As described above, the liquid droplets are generated in a stage on a relatively downstream side of the steam turbine. In the stages on the relatively downstream side of the steam turbine, the turbine blades tend to be relatively large in size. Therefore, forming a fine slit in a relatively large turbine blade is difficult to process, and there is a concern about cost increase.

At least one embodiment of the present disclosure has been made in view of the above-described circumstances, and an object thereof is to efficiently remove liquid-phase water adhering to a surface of a blade while suppressing an increase in cost.

Solution to Problem (1) A steam turbine blade according to at least one embodiment of the present disclosure includes a recess portion that is formed on a surface of a blade, a liquid phase guidance member that is inserted into and fixed to the recess portion and has a surface on which recesses and projections for guiding liquid-phase water to a trailing edge side of the blade are formed, or on which a hydrophilic coating is applied, and a through-hole for taking in the liquid-phase water guided by the liquid phase guidance member into an inner space of the blade.

(2) A steam turbine according to at least one embodiment of the present disclosure includes the steam turbine blade according to the configuration of the above (1).

(3) A method for manufacturing a steam turbine blade according to at least one embodiment of the present disclosure includes a step of forming a recess portion on a surface of the blade, a step of forming a through-hole communicating with an inner space of the blade at a position on a trailing edge side of the blade with respect to the recess portion, and a step of inserting and fixing a liquid phase guidance member that has a surface on which recesses and projections for guiding liquid-phase water to the trailing edge side of the blade are formed, or on which a hydrophilic coating is applied, into the recess portion.

Advantageous Effects of Invention

According to at least one embodiment of the present disclosure, it is possible to efficiently remove liquid adhering to a surface of a blade while suppressing an increase in cost.

DESCRIPTION OF EMBODIMENTS

Figure 1:
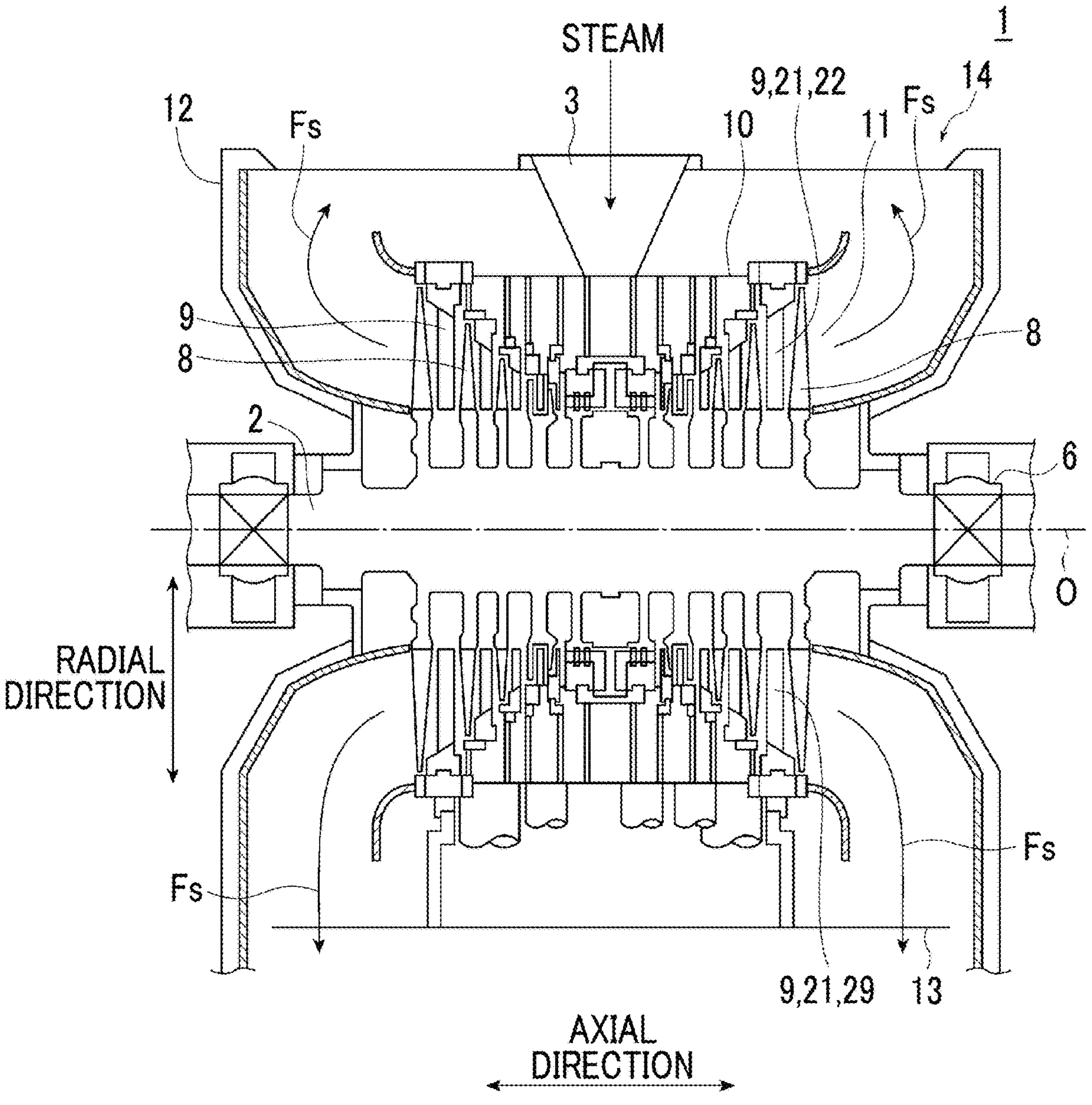
FIG. 1 is a schematic cross-sectional view taken along an axial direction of a steam turbine according to one embodiment.

Hereinafter, some embodiments of the present disclosure will be described with reference to the accompanying drawings. However, dimensions, materials, shapes, and relative dispositions of components described as the embodiments or illustrated in the drawings are not intended to limit the scope of the present disclosure, and are merely examples for describing the present disclosure.

For example, expressions representing relative or absolute dispositions such as “in a certain direction”, “along a certain direction”, “parallel”, “orthogonal”, “center”, “concentric”, or “coaxial” not only strictly represent the dispositions, but also represent a state of being relatively displaced with a tolerance or at an angle or a distance to the extent that the same function can be obtained.

For example, expressions representing that matters are in an equal state such as “same”, “equal”, and “homogeneous” not only represent a strictly equal state, but also represent a state where a tolerance or a difference exists to the extent that the same function can be obtained.

For example, expressions representing shapes such as a quadrangular shape and a cylindrical shape not only represent shapes such as a quadrangular shape and a cylindrical shape in a geometrically strict sense, but also represent shapes including concave and convex portions, chamfered portions, and the like within a range where the same effect can be obtained.

In addition, expressions of “being provided with”, “being equipped with”, “including”, or “having” one component are not exclusive expressions excluding the presence of other components.

First, an overall configuration of a steam turbine according to some embodiments will be described.

FIG. 1 is a schematic cross-sectional view taken along an axial direction of the steam turbine according to one embodiment of the present disclosure. As illustrated in FIG. 1, a steam turbine 1 includes a rotor 2 that is rotatably supported by a bearing 6 around a central axis O, a plurality of stages of rotor blades 8 that are attached to the rotor 2, an inner casing 10 that houses the rotor 2 and the rotor blades 8, and a plurality of stages of stator blades 9 that are attached to the inner casing 10 so as to face the rotor blades 8. In addition, an outer casing 12 is provided on an outer side of the inner casing 10. In such a steam turbine 1, in a case where steam is introduced into the inner casing 10 from a steam inlet 3, the steam is expanded and accelerated when passing through the stator blades 9, and thus works on the rotor blades 8 to rotate the rotor 2.

In addition, the steam turbine 1 includes an exhaust hood 14. As illustrated in FIG. 1, the exhaust hood 14 is located on a downstream side of the rotor blades 8 and the stator blades 9. The steam (steam flow Fs) that has passed through the rotor blade 8 and the stator blade 9 in the inner casing 10 flows into the exhaust hood 14 from an exhaust hood inlet 11, passes through the inside of the exhaust hood 14, and is exhausted to the outside of the steam turbine 1 from an exhaust hood outlet 13 provided on a lower side of the exhaust hood 14. In some embodiments, a condenser (not illustrated) is provided below the exhaust hood 14. In this case, the steam that has finished working on the rotor blade 8 in the steam turbine 1 flows into the condenser from the exhaust hood 14 through the exhaust hood outlet 13.

Figure 2A:
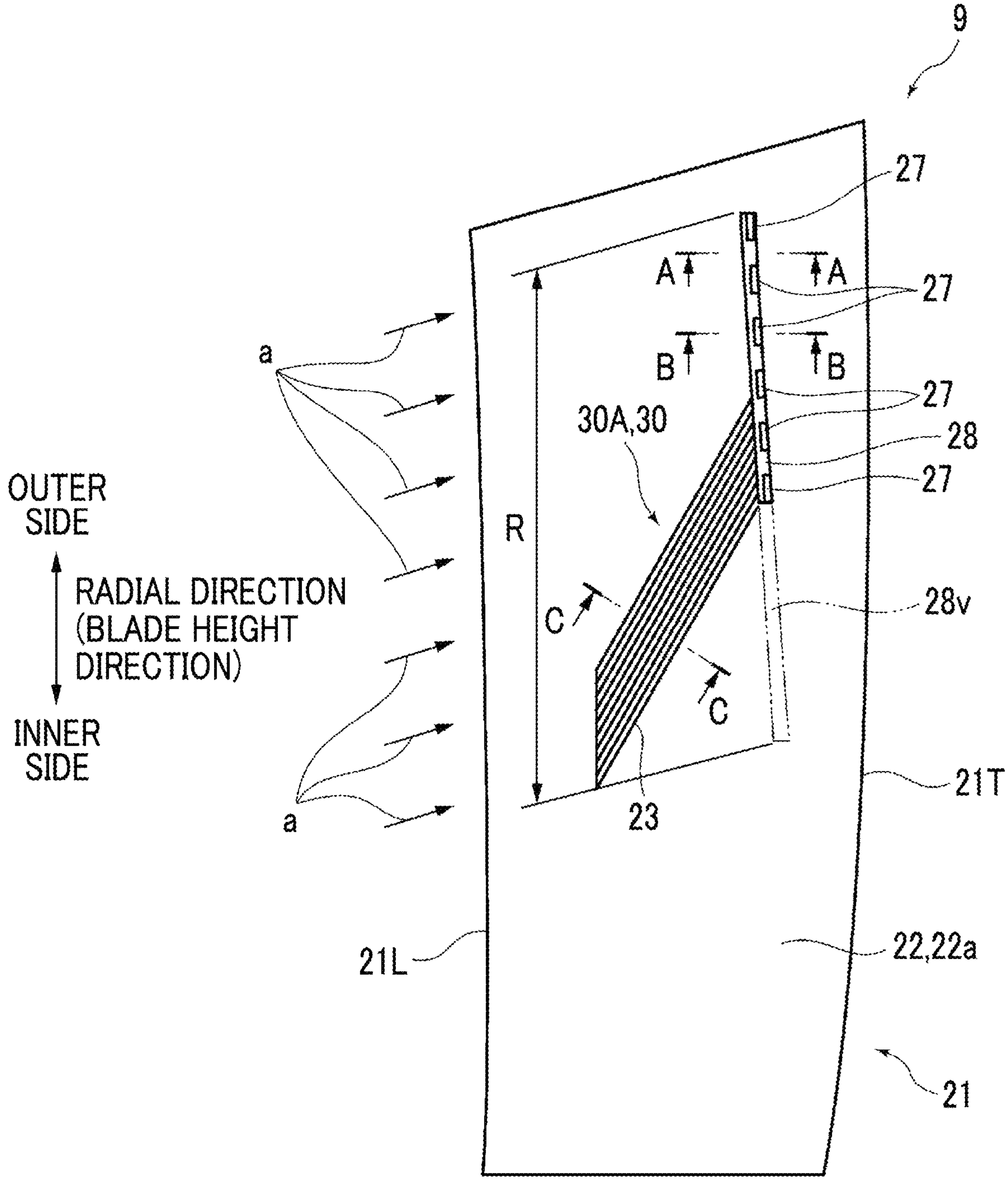
FIG. 2A is a schematic diagram illustrating a blade surface on a pressure side of a blade shape portion of a stator blade in a stage on a downstream side among a plurality of stages of the stator blade.

FIG. 2A is a schematic diagram illustrating a blade surface 22*a* on a pressure side 22 of a blade shape portion 21 of the stator blade 9 in a stage on a downstream side among a plurality of stages of stator blades 9, and illustrates an example of an arrangement of a liquid phase guidance member 30 according to one embodiment, which will be described later.

Figure 2B:
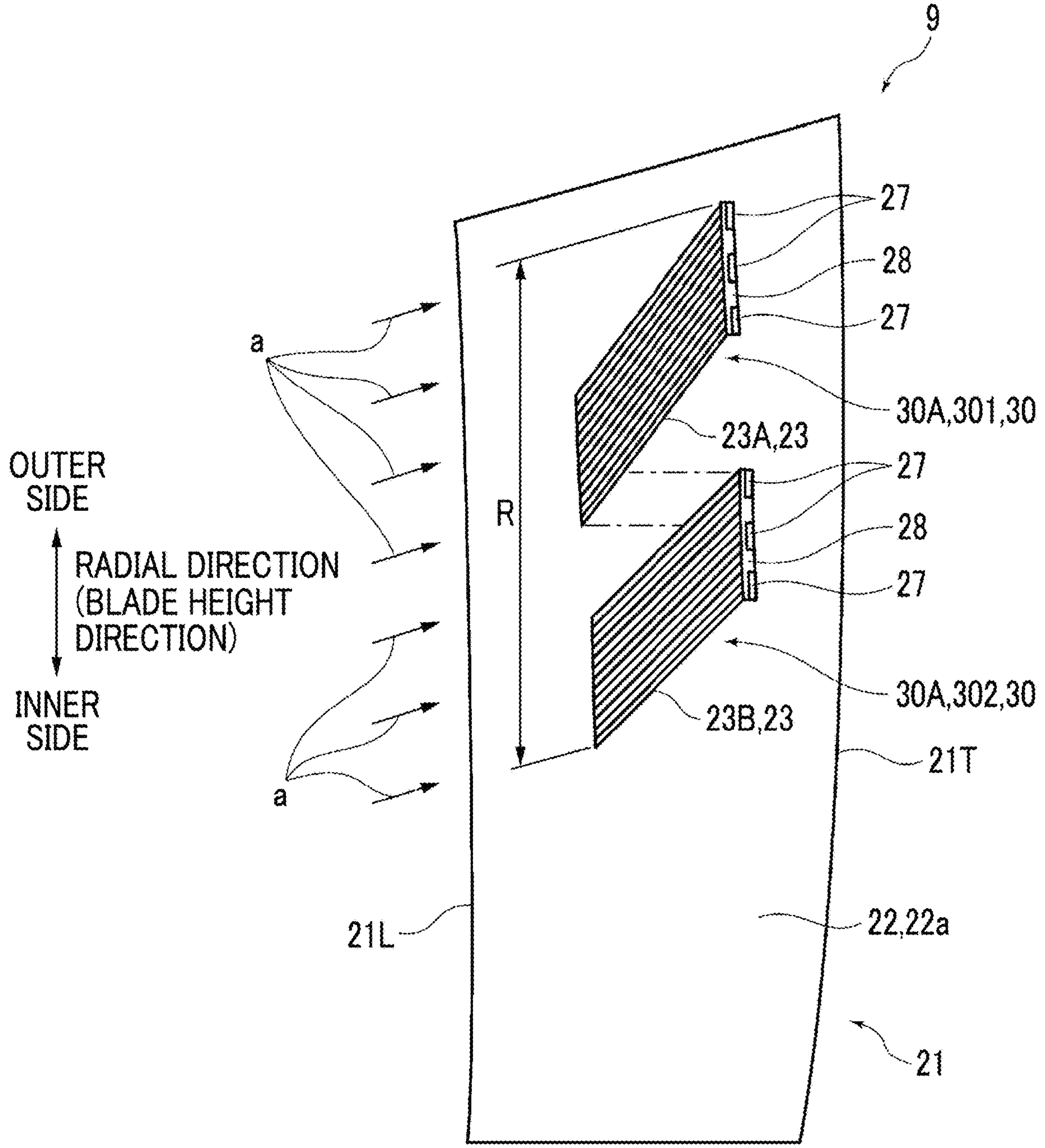
FIG. 2B is a schematic diagram illustrating a blade surface on a pressure side of a blade shape portion of a stator blade in a stage on a downstream side among a plurality of stages of the stator blade.

FIG. 2B is a schematic diagram illustrating the blade surface 22*a* on the pressure side 22 of the blade shape portion 21 of the stator blade 9 in a stage on the downstream side among the plurality of stages of stator blades 9, and illustrates another example of an arrangement of the liquid phase guidance member 30 according to one embodiment, which will be described later.

Figure 3A:
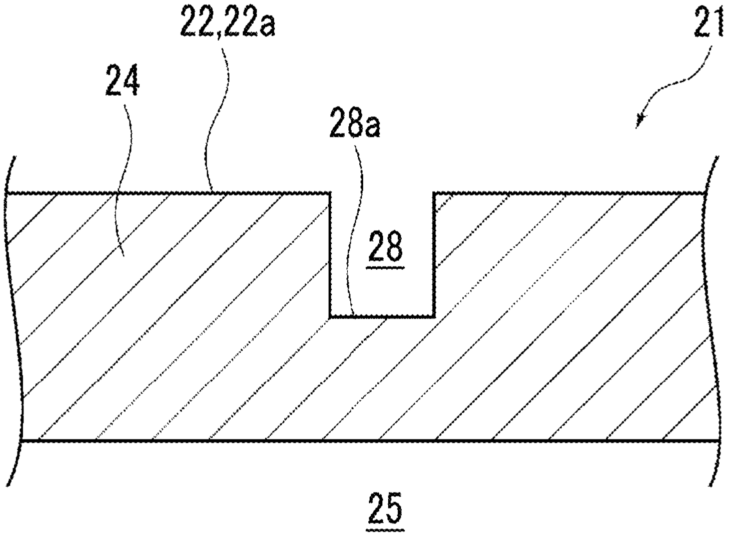
FIG. 3A is a cross-sectional view taken along line A-A of FIG. 2A.

FIG. 3A is a cross-sectional view taken along line A-A of FIG. 2A.

Figure 3B:
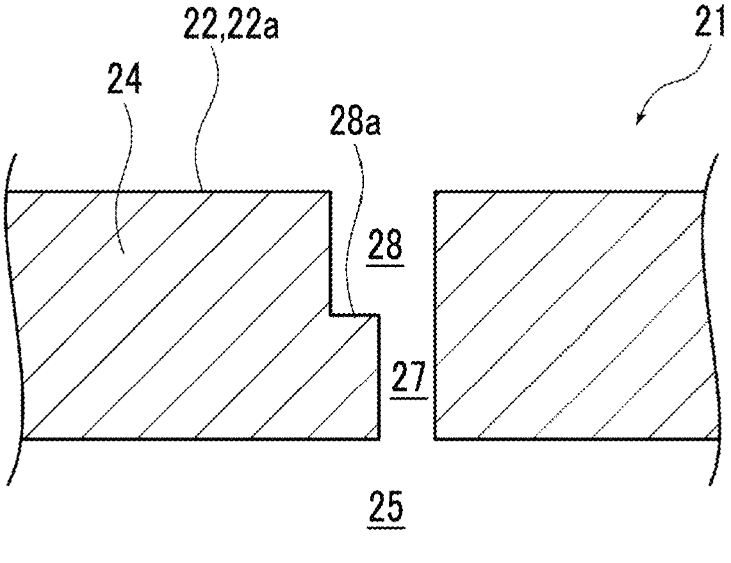
FIG. 3B is a cross-sectional view taken along line B-B of FIG. 2A.

FIG. 3B is a cross-sectional view taken along line B-B of FIG. 2A.

Figure 3C:
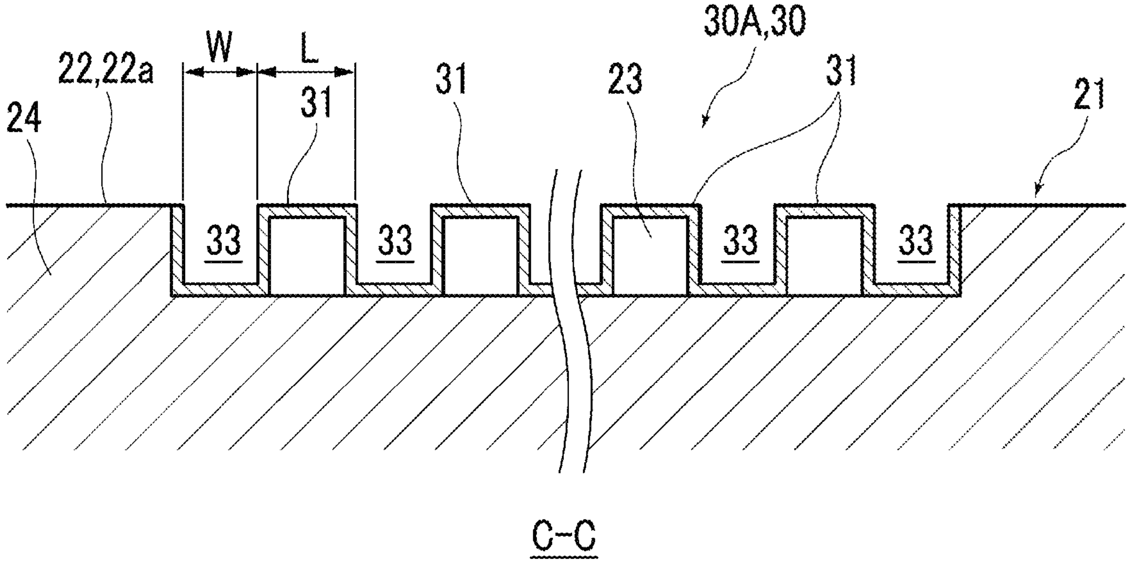
FIG. 3C is a cross-sectional view taken along line C-C of FIG. 2A.

FIG. 3C is a cross-sectional view taken along line C-C of FIG. 2A.

Figure 4:
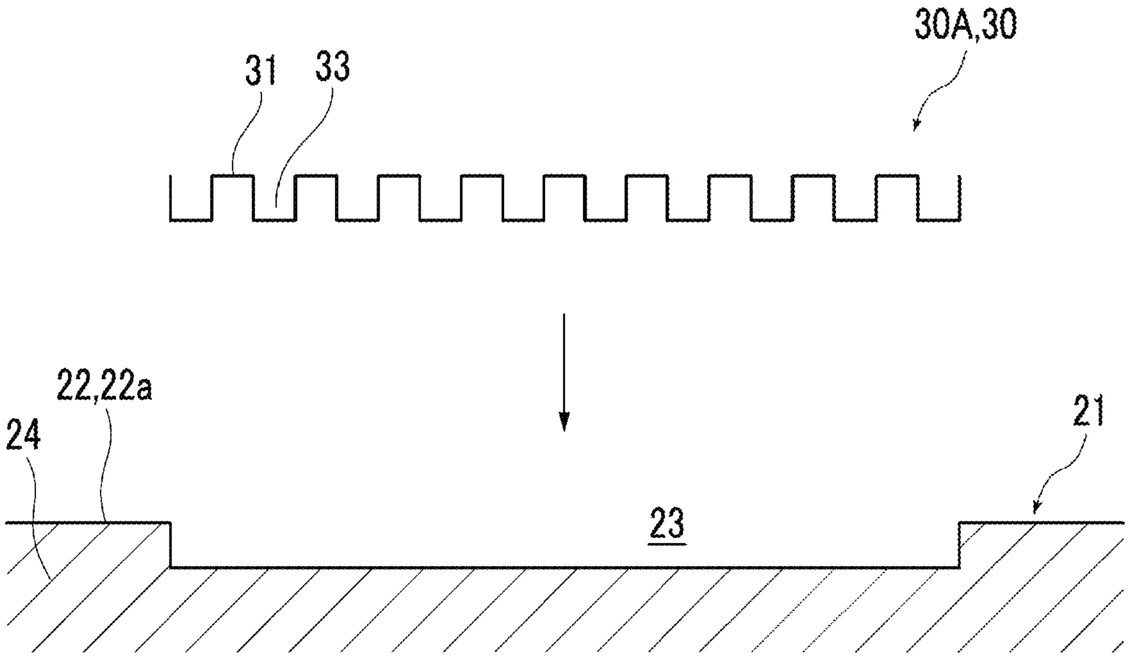
FIG. 4 is a diagram corresponding to an exploded view of FIG. 3C.

FIG. 4 is a diagram corresponding to an exploded view of FIG. 3C.

Figure 5A:
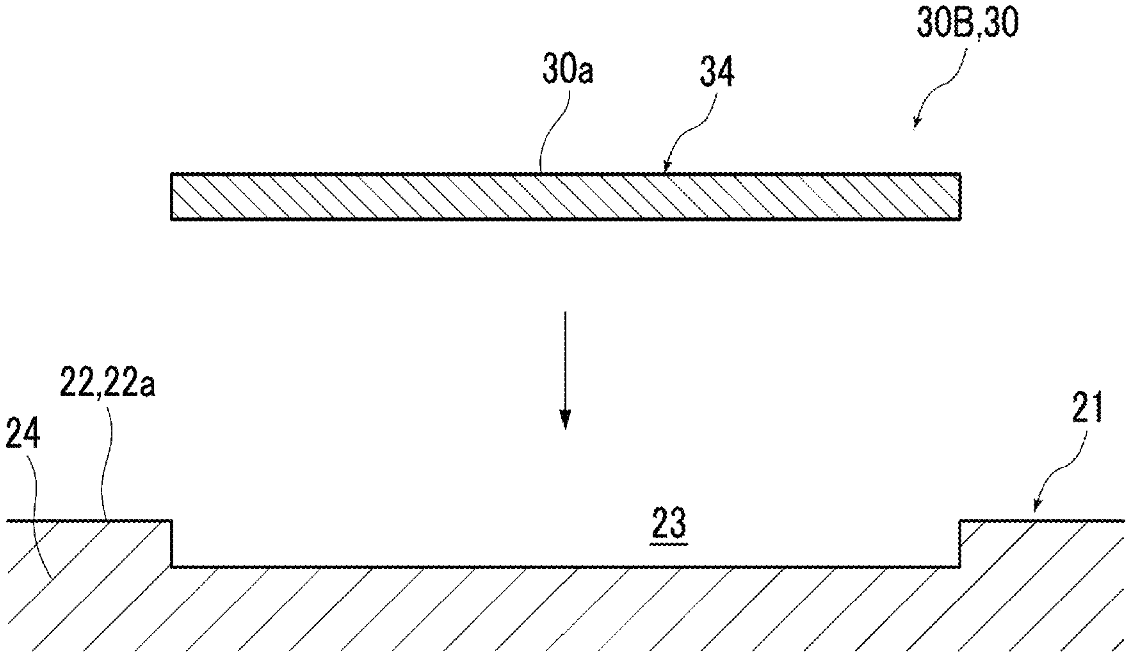
FIG. 5A is a diagram corresponding to FIG. 4 and is a diagram illustrating a case where a liquid phase guidance member according to another embodiment is used.

FIG. 5A is a diagram corresponding to FIG. 4 and is a diagram illustrating a case where the liquid phase guidance member 30 according to another embodiment is used.

Figure 5B:
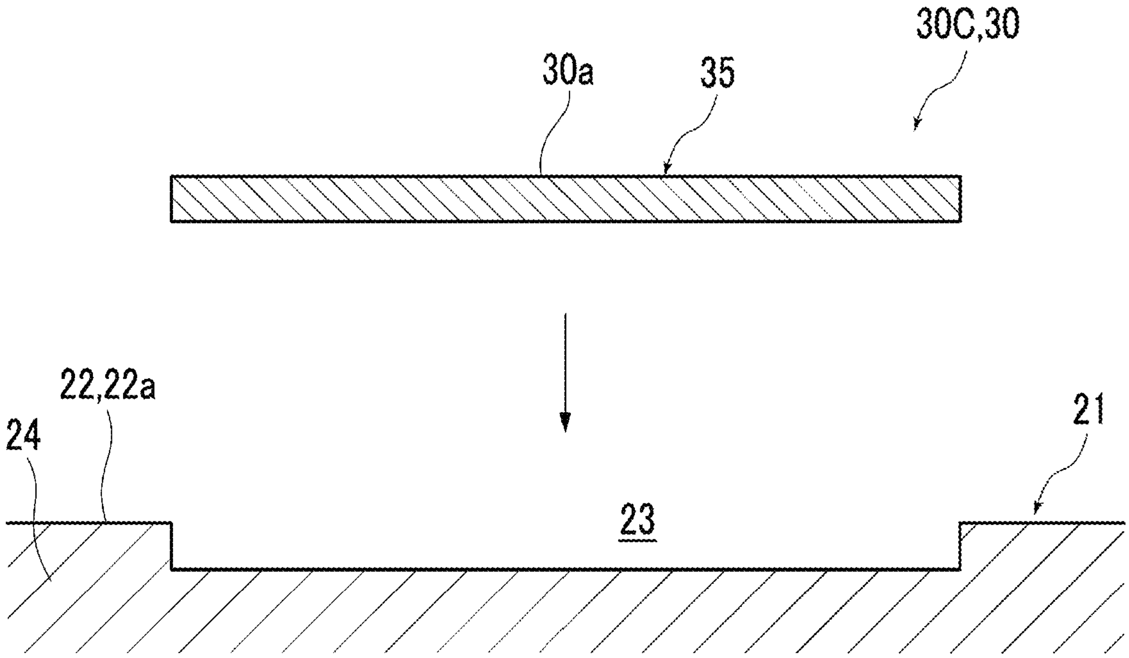
FIG. 5B is a diagram corresponding to FIG. 4 and is a diagram illustrating a case where a liquid phase guidance member according to still another embodiment is used.

FIG. 5B is a diagram corresponding to FIG. 4 and is a diagram illustrating a case where the liquid phase guidance member 30 according to still another embodiment is used.

Unless otherwise specified, in the following description, the stator blade 9 is a stator blade 9 in a stage on the downstream side among the plurality of stages of the stator blades 9.

The stator blade 9 according to some embodiments includes a recess portion 23 formed on a surface of a blade (blade shape portion 21), a liquid phase guidance member 30 that is inserted into and fixed to the recess portion 23 and that guides the liquid-phase water to a trailing edge 21T side of the blade, a through-hole 27 for taking in the liquid-phase water guided by the liquid phase guidance member 30 to an inner space 25 of the blade shape portion 21, and a guide groove 28.

The blade shape portion 21 of the stator blade 9 according to some embodiments has a hollow structure. The stator blade 9 according to some embodiments is configured to discharge liquid-phase water taken in an inner space 25 to the outside of the blade shape portion 21 as will be described later.

(Recess Portion 23)

In the stator blade 9 according to some embodiments, the recess portion 23 is a recess portion formed on the blade surface 22*a* of the pressure side 22 to attach the liquid phase guidance member 30. A depth of the recess portion 23 may be set such that a projecting portion 31, which will be described later, of the liquid phase guidance member 30 attached to the recess portion 23 has the same height in a blade thickness direction as the blade surface 22*a* around the recess portion 23 of the blade shape portion 21, that is, the projecting portion 31 of the liquid phase guidance member 30 does not protrude from the blade surface 22*a* around the recess portion 23 of the blade shape portion 21.

(Regarding Liquid Phase Guidance Member 30)

In the stator blade 9 according to some embodiments, the liquid phase guidance member 30 is a member for efficiently guiding the liquid-phase water on the surface of the liquid phase guidance member 30 to the through-hole 27 which will be described later.

In the examples illustrated in FIGS. 2A, 2B, 3C, and 4, the liquid phase guidance member 30 is formed with a plurality of grooves 33 extending from a leading edge 21L of the blade shape portion 21 toward the trailing edge 21T.

In the example illustrated in FIG. 5A, the liquid phase guidance member 30 is a member in which fine recesses and projections for obtaining hydrophilicity are formed on a surface 30*a*.

In the example illustrated in FIG. 5B, the liquid phase guidance member 30 is a member on which a hydrophilic coating for obtaining hydrophilicity is applied on the surface 30*a*.

The details of the liquid phase guidance member 30 will be described later.

In the stator blade 9 according to some embodiments, the liquid phase guidance member 30 is fixed to the recess portion 23 by welding or using an adhesive agent.

(Through-Hole 27 and Guide Groove 28)

As illustrated in FIGS. 2A, 2B, and 3B, in the stator blade 9 according to some embodiments, a plurality of through-holes 27 for taking in the liquid-phase water guided by the liquid phase guidance member 30 into the inner space 25 of the blade shape portion 21 are formed.

In the stator blade 9 according to some embodiments, the through-hole 27 is a hole that penetrates a blade wall 24 of the blade shape portion 21 on the pressure side 22, and is disposed at a position relatively close to the trailing edge 21T of the blade shape portion 21 at an interval in a blade height direction.

The through-hole 27 is a relatively fine hole. Therefore, in order to efficiently guide the liquid-phase water guided by the liquid phase guidance member 30 to such a plurality of relatively fine through-holes 27, the guide groove 28 is formed in the blade wall 24 of the blade shape portion 21 on the pressure side 22 so as to trace along the plurality of through-holes 27 disposed at intervals in the blade height direction.

The plurality of through-holes 27 are provided to open to a bottom 28*a* of the guide groove 28.

(Advantages of Providing Liquid Phase Guidance Member 30)

In the stator blade 9 according to some embodiments, the liquid-phase water adhering in a range R in which the liquid-phase water is collected on the blade surface 22*a* of the blade shape portion 21 on the pressure side 22 flows in a direction of an arrow a of FIG. 2A and FIG. 2B under the influence of the steam flow Fs. The liquid-phase water is guided to the through-hole 27 by the liquid phase guidance member 30 and the guide groove 28 provided in the range R, and is taken in the inner space 25.

For example, in the case of the stator blade 9 of the related art not including the liquid phase guidance member 30, in addition to the guide groove 28 of FIG. 2A, for example, the guide groove 28 indicated by a two-dot chain line in FIG. 2A is formed, so that it is necessary to form the guide groove 28 having a relatively long length corresponding to the above-described range R and further to provide a large number of through-holes 27.

However, the stator blade 9 in the stage of the downstream side has a relatively large blade size. Therefore, forming the fine through-hole 27 and guide grooves 28 in the relatively large stator blade 9 is difficult to process, and there is a concern about cost increase.

In that regard, with the stator blade 9 according to some embodiments, since the liquid-phase water can be guided to the through-hole by the liquid phase guidance member 30, the range where the through-hole 27 is provided can be narrowed, the number of the through-holes 27 can be reduced, and the length of the guide groove 28 can be shortened. As a result, it is possible to efficiently remove the liquid-phase water adhering to the surface of the blade shape portion 21 while reducing the cost of providing the through-holes 27 and the guide grooves 28 in the relatively large stator blade 9.

In the steam turbine 1 including the stator blade 9 according to some embodiments, it is possible to efficiently remove the liquid-phase water adhering to the surface of the stator blade 9 or of the liquid phase guidance member 30 while reducing the cost of providing the through-holes 27 in the relatively large stator blade 9.

(Details of Liquid Phase Guidance Member 30)

In the examples illustrated in FIGS. 2A, 2B, 3C, and 4, a liquid phase guidance member 30A (30) may be formed, for example, by bending a plate-shaped member so that a plurality of grooves 33 extend from the leading edge 21L toward the trailing edge 21T. For example, by pressing the plate-shaped member, the liquid phase guidance member 30A having such a shape can be obtained as a press molded product.

As a result, it is possible to reduce the manufacturing cost of the liquid phase guidance member.

The liquid phase guidance member 30A thus formed has a plurality of grooves 33 and projecting portions 31 formed between adjacent grooves 33 to separate the adjacent grooves 33. That is, in the liquid phase guidance member 30A illustrated in FIGS. 2A, 2B, 3C, and 4, recesses and projections for guiding the liquid-phase water to the trailing edge 21T side of the blade shape portion 21 are formed on the surface.

As illustrated in FIG. 5A, a liquid phase guidance member 30B (30) may be a member having a hydrophilic processed surface 34 on which fine recesses and projections for obtaining hydrophilicity are formed on the surface 30*a*. The hydrophilic processed surface 34 is obtained, for example, by drawing a fine pattern on the surface 30*a* of the liquid phase guidance member 30B by laser etching or the like. That is, the liquid phase guidance member 30B illustrated in FIG. 5A has recesses and projections formed on the surface thereof for guiding the liquid-phase water to the trailing edge 21T side of the blade shape portion 21.

As illustrated in FIG. 5B, a liquid phase guidance member 30C (30) may be a member on which a hydrophilic coating 35 for obtaining hydrophilicity is applied on the surface 30*a*. The hydrophilic coating 35 is obtained by forming a thin film of $SiO_2$, $TiO_2$, or the like on the surface 30*a*, for example.

In the following description, in a case where it is not necessary to distinguish between the liquid phase guidance members 30A illustrated in FIGS. 2A, 2B, 3C, and 4, the liquid phase guidance member 30B illustrated in FIG. 5A, and the liquid phase guidance member 30C illustrated in FIG. 5B, or in a case where these liquid phase guidance members 30A, 30B, and 30C are collectively referred to, the description of the letter at the end of the reference numeral will be omitted, and the liquid phase guidance members 30A, 30B, and 30C will simply be referred to as "liquid phase guidance member 30".

In the stator blade 9 according to some embodiments, for example, as illustrated in FIG. 2A, the liquid phase guidance member 30 illustrated in any one of FIG. 4, FIG. 5A, or FIG.

5B may be disposed in one recess portion 23 formed in the blade surface 22*a* of the pressure side 22.

In addition, in the stator blade 9 according to some embodiments, as illustrated in FIG. 2B, for example, the recess portion 23 may include a first recess portion 23A and a second recess portion 23B formed at a position different from the first recess portion 23A in the blade height direction. The liquid phase guidance member 30 may include a first liquid phase guidance member 301 that is inserted into and fixed to the first recess portion 23A and a second liquid phase guidance member 302 that is inserted into and fixed to the second recess portion 23B.

As a result, even in a case where the liquid phase guidance member 30 is provided in a relatively wide range in the blade height direction, it is possible to relatively narrow the range where the through-holes 27 are provided.

The liquid phase guidance member 30 illustrated in any one of FIG. 4, FIG. 5A, or FIG. 5B may be disposed in the first recess portion 23A and the second recess portion 23B.

The liquid phase guidance member 30 disposed in the first recess portion 23A and the liquid phase guidance member 30 disposed in the second recess portion 23B may be, for example, the same type of liquid phase guidance member 30, such as both being the liquid phase guidance member 30A.

In addition, the liquid phase guidance member 30 disposed in the first recess portion 23A and the liquid phase guidance member 30 disposed in the second recess portion 23B may be different types of liquid phase guidance members 30, for example, the liquid phase guidance member 30A may be disposed in the first recess portion 23A and the liquid phase guidance member 30B may be disposed in the second recess portion 23B.

In the stator blade 9 according to some embodiments, as described above, the height of the projecting portion 31 of the liquid phase guidance member 30A in the blade thickness direction or the height of the projecting portion of the hydrophilic processed surface 34 of the liquid phase guidance member 30B in the blade thickness direction, or the height of the surface of the hydrophilic coating 35 of the liquid phase guidance member 30C in the blade thickness direction may be the same as the height of the blade surface 22*a* of the blade shape portion 21 on the pressure side 22 in the blade thickness direction.

As a result, it is possible to efficiently guide the liquid-phase water.

Figure 6A:
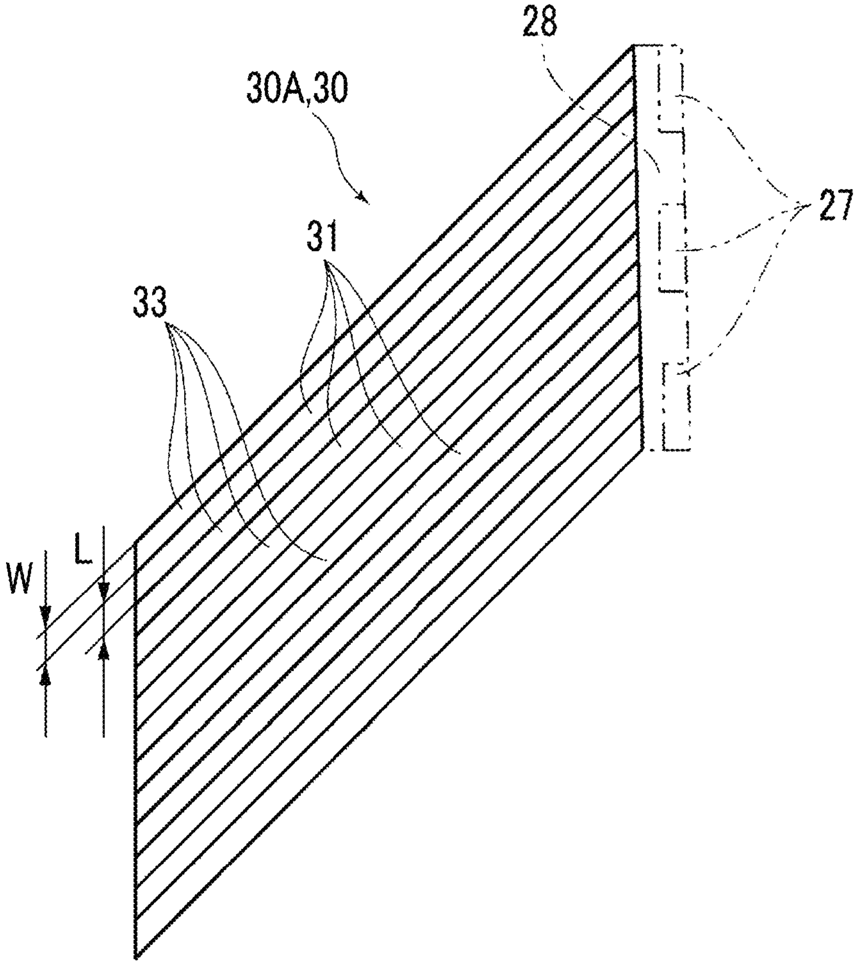
FIG. 6A is a schematic view illustrating an example of the liquid phase guidance member.

FIG. 6A is a schematic view illustrating an example of the liquid phase guidance member 30A.

Figure 6B:
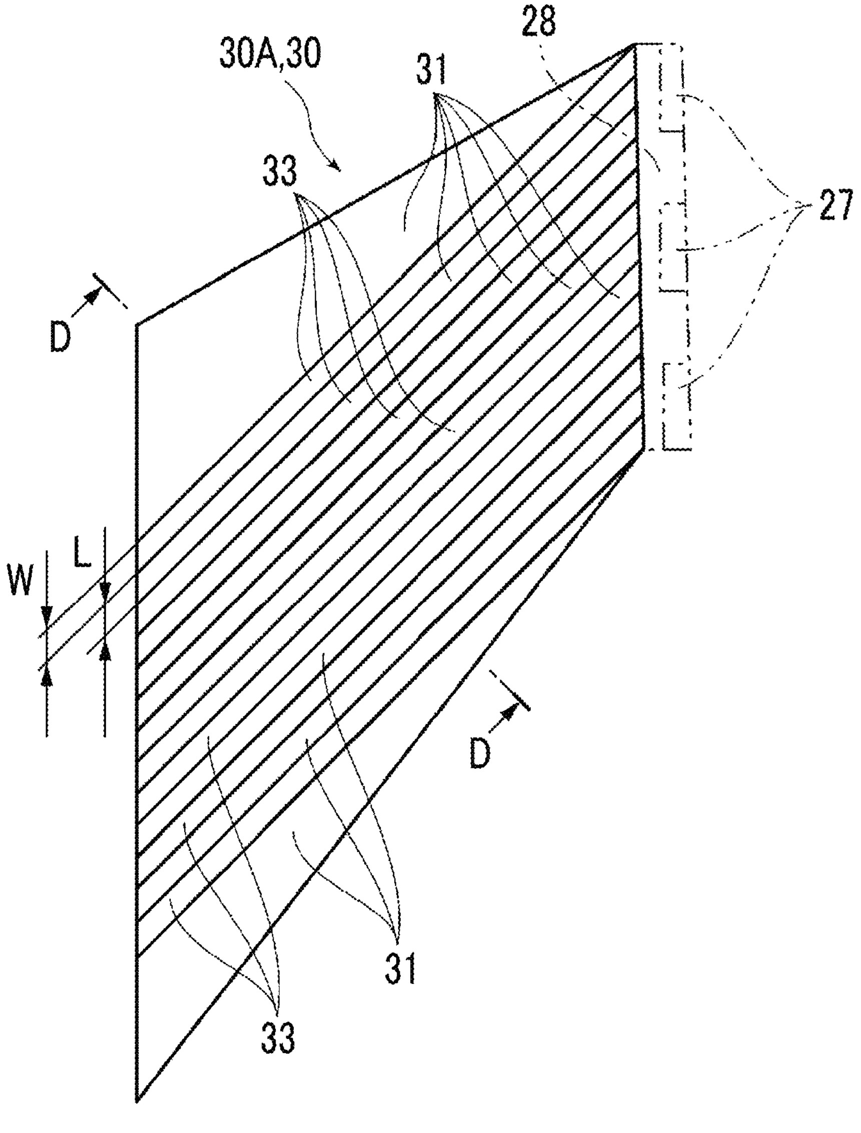
FIG. 6B is a schematic view illustrating another example of the liquid phase guidance member.

FIG. 6B is a schematic view illustrating another example of the liquid phase guidance member 30A.

Figure 6C:
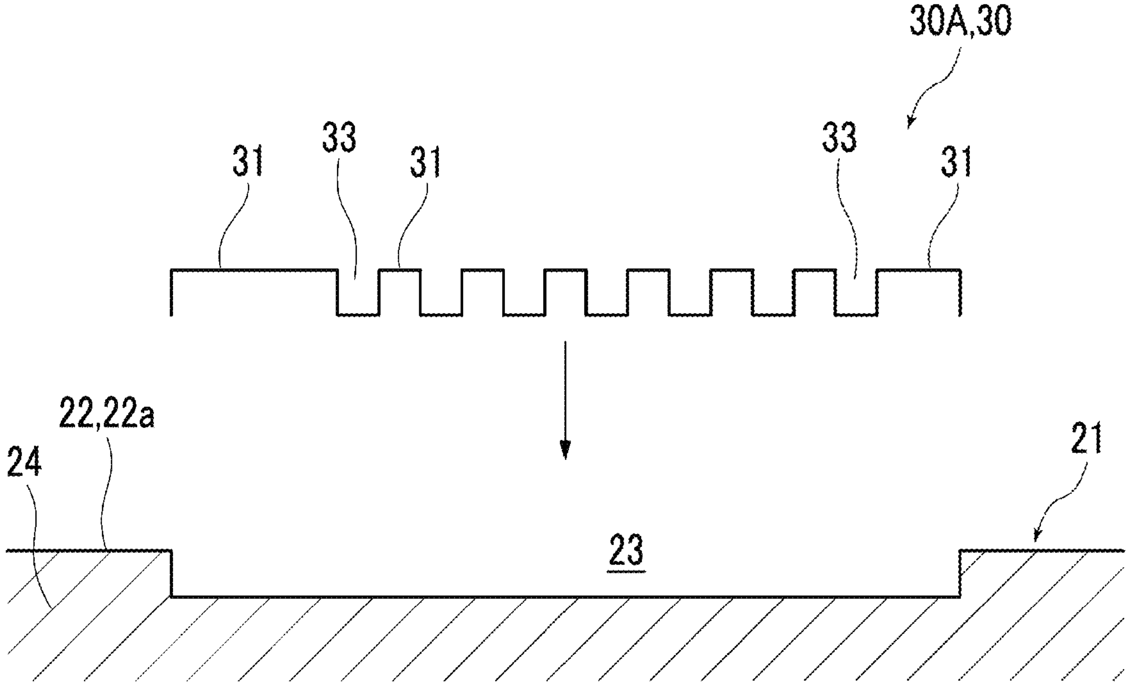
FIG. 6C is an exploded cross-sectional view taken along line D-D of FIG. 6B.

FIG. 6C is an exploded cross-sectional view taken along line D-D of FIG. 6B.

Figure 7:
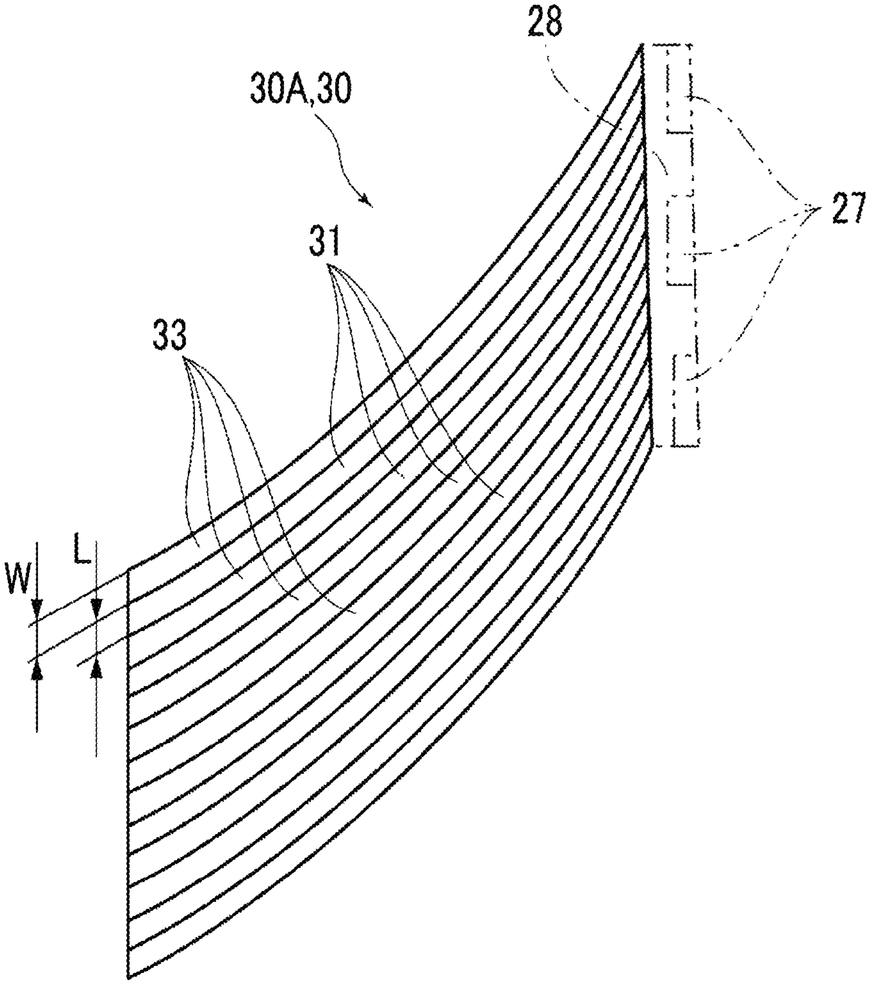
FIG. 7 is a schematic view illustrating still another example of the liquid phase guidance member

FIG. 7 is a schematic view illustrating still another example of the liquid phase guidance member 30A.

Figure 8:
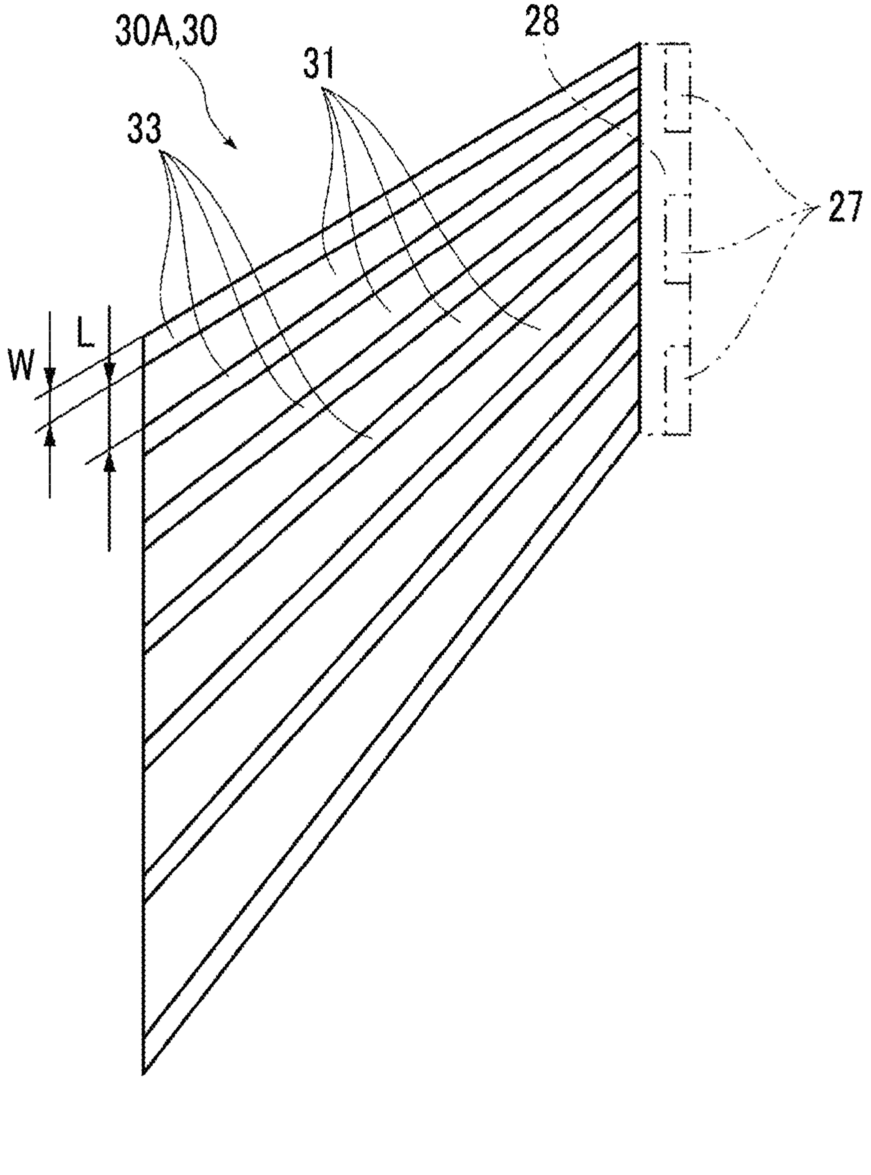
FIG. 8 is a schematic view illustrating still another example of the liquid phase guidance member.

FIG. 8 is a schematic view illustrating still another example of the liquid phase guidance member 30A.

Figure 9:
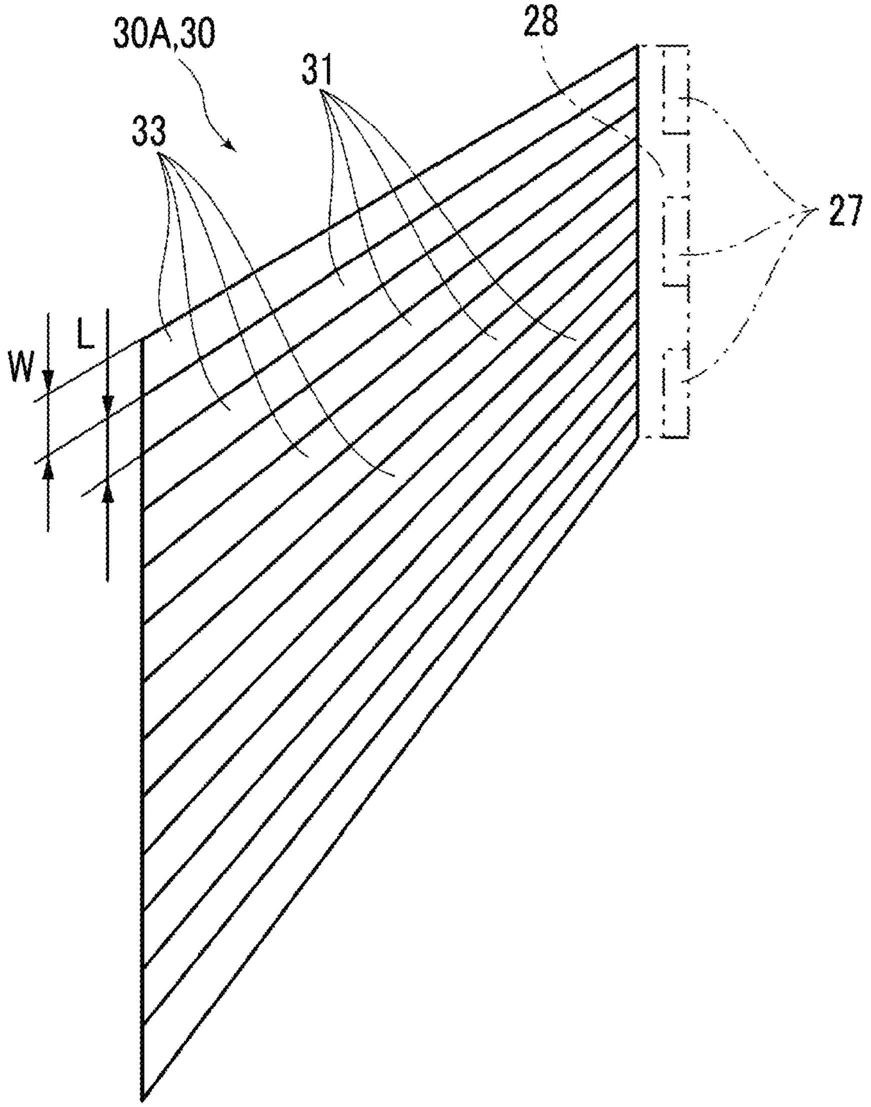
FIG. 9 is a schematic view illustrating still another example of the liquid phase guidance member.

FIG. 9 is a schematic view illustrating still another example of the liquid phase guidance member 30A.

In the stator blade 9 according to some embodiments, as illustrated in FIGS. 6A, 7, 8, and 9, a region where the groove 33 is formed may be the entire region of the liquid phase guidance member 30A in the blade height direction.

Similarly, in the stator blade 9 according to some embodiments, a region where the hydrophilic processed surface 34 is formed and a region where the hydrophilic coating 35 is applied may be the entire region of the liquid phase guidance members 30B and 30C in the blade height direction.

That is, a region where the recesses and projections are formed in the liquid phase guidance member 30A and the liquid phase guidance member 30B or a region where the hydrophilic coating 35 is applied may be the entire region of the liquid phase guidance member 30 in the blade height direction.

As a result, it is possible to efficiently guide the liquid-phase water to the through-hole 27 over the entire region of the liquid phase guidance member 30A in the blade height direction.

In the stator blade 9 according to some embodiments, as illustrated in FIGS. 6B and 6C, a region where the groove 33 is formed may be a part of a region of the liquid phase guidance member 30 in the blade height direction.

Similarly, in the stator blade 9 according to some embodiments, a region where the hydrophilic processed surface 34 is formed and a region where the hydrophilic coating 35 is applied may be a part of a region of the liquid phase guidance members 30B and 30C in the blade height direction.

That is, a region where the recesses and projections are formed in the liquid phase guidance member 30A and the liquid phase guidance member 30B or a region where the hydrophilic coating 35 is applied may be a part of a region of the liquid phase guidance member 30 in the blade height direction.

Accordingly, a range in which the liquid-phase water is collected can be changed as appropriate, and thus it is easy to correspond to the difference in the distribution condition of the liquid-phase water in the blade shape portion 21.

In the stator blade 9 according to some embodiments, as illustrated in FIG. 2B, a part of a region of the first liquid phase guidance member 301 and a part of a region of the second liquid phase guidance member 302 may overlap each other in the blade height direction.

For example, in FIG. 2B, a part of the region on a radially inner side in the first liquid phase guidance member 301 and a part of the region on a radially outer side in the second liquid phase guidance member 302 overlap each other in the blade height direction by a distance in a radial direction (blade height direction) sandwiched between two one-dot chain lines.

As a result, it is possible to efficiently collect the liquid-phase water in a relatively wide range in the blade height direction.

In the stator blade 9 according to some embodiments, as illustrated in FIGS. 3C and 4, the recesses and projections for guiding the liquid-phase water to the trailing edge 21T side of the blade shape portion 21 are formed by a plurality of grooves 33 extending from the leading edge 21L of the blade shape portion 21 toward the trailing edge 21T.

As a result, it is possible to efficiently collect the liquid-phase water in the through-hole through the plurality of grooves.

In the stator blade 9 according to some embodiments, as illustrated in FIG. 6A, at least one of the plurality of grooves 33 in the liquid phase guidance member 30A may be formed in a linear shape when view from the blade thickness direction.

As a result, it is possible to simplify the configuration of the liquid phase guidance member 30A.

In the stator blade 9 according to some embodiments, as illustrated in FIG. 7, at least one of the plurality of grooves 33 in the liquid phase guidance member 30A may be formed in a curved shape in at least a part of a region when view from the blade thickness direction.

As a result, for example, since the groove 33 can be formed in a direction in which the liquid-phase water tends to flow by being affected by the flow of the steam inside the steam turbine 1, it is possible to efficiently collect the liquid-phase water.

In the stator blade 9 according to some embodiments, an interval L between two grooves 33 adjacent to each other in the blade height direction among the plurality of grooves 33 in the liquid phase guidance member 30A may be the same in a region on the leading edge 21L side and a region on the trailing edge 21T side of the blade shape portion 21 as illustrated in FIG. 6A, for example.

In the stator blade 9 according to some embodiments, an interval L between two grooves 33 adjacent to each other in the blade height direction among the plurality of grooves 33 in the liquid phase guidance member 30A may be different between the region on the leading edge 21L side and the region on the trailing edge 21T side of the blade shape portion 21 as illustrated in FIG. 8, for example.

As a result, the range in which the liquid-phase water is collected can be changed as appropriate by adjusting the interval between the grooves 33 as appropriate, and thus it is easy to correspond to the difference in the distribution condition of the liquid-phase water in the blade shape portion 21.

In the stator blade 9 according to some embodiments, a width W of the plurality of grooves 33 in the liquid phase guidance member 30A may be the same in the region on the leading edge 21L side and the region on the trailing edge 21T side of the blade shape portion 21 as illustrated in FIG. 6A, for example.

In the stator blade 9 according to some embodiments, in at least one of the plurality of grooves 33 in the liquid phase guidance member 30A, the width W of the groove 33 may be different between the region on the leading edge 21L side and the region on the trailing edge 21T side of the blade shape portion 21 as illustrated in FIG. 9, for example.

As a result, the range in which the liquid-phase water is collected can be changed as appropriate by adjusting the width W of the groove 33 as appropriate, and thus it is easy to correspond to the difference in the distribution condition of the liquid-phase water in the blade shape portion 21.

(Regarding Method for Manufacturing Stator Blade 9)

Figure 10:
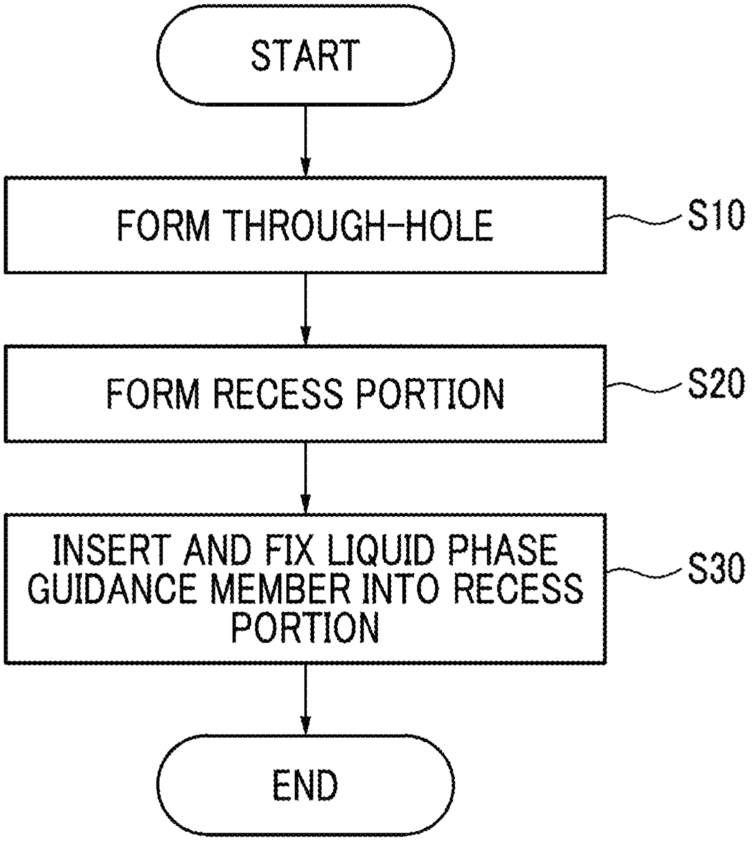
FIG. 10 is a flowchart illustrating a procedure of a method for manufacturing a stator blade according to some embodiments.

FIG. 10 is a flowchart illustrating a procedure of the method for manufacturing the stator blade 9 according to some embodiments.

The method for manufacturing the stator blade 9 according to some embodiments includes a step S10 of forming the through-hole 27, a step S20 of forming the recess portion 23, and a step S30 of inserting and fixing the liquid phase guidance member 30 into the recess portion 23.

The step S10 of forming the through-hole 27 is a step of forming the through-hole 27 that communicates with the inner space 25 of the blade shape portion 21 at a position on the trailing edge 21T side of the blade shape portion 21 with respect to the recess portion 23 to be formed later in the blade wall 24 of the blade shape portion 21 on the pressure side 22. In step S10 of forming the through-hole 27, for example, the guide groove 28 is formed by machining or discharging, and then the through-hole 27 is formed by the same machining or discharging.

The step S20 of forming the recess portion 23 is a step of forming the recess portion 23 on the blade surface 22*a* of the pressure side 22 of the blade shape portion 21. In step S20 of forming the recess portion 23, the recess portion 23 is formed on the blade surface 22*a* of the pressure side 22 of the blade shape portion 21 by, for example, machining or discharging.

Any of step S10 of forming the through-hole 27 and step S20 of forming the recess portion 23 may be performed first.

The step S30 of inserting and fixing the liquid phase guidance member 30 into the recess portion 23 is a step of inserting and fixing the liquid phase guidance member 30 into the recess portion 23 formed in step S20 of forming the recess portion 23. In step S30 of inserting and fixing the liquid phase guidance member 30 into the recess portion 23, the liquid phase guidance member 30 is inserted into the recess portion 23 and the liquid phase guidance member 30 is fixed to the recess portion 23 by welding or using an adhesive agent.

According to the method for manufacturing the stator blade 9 according to some embodiments, it is possible to provide the stator blade 9 that is capable of efficiently removing the liquid-phase water adhering to the surface of the blade shape portion 21 or of the liquid phase guidance member 30 while reducing the cost of providing the through-holes 27 in the relatively large stator blade 9.

The present disclosure is not limited to the above-described embodiments, and also includes a form in which modifications are added to the above-described embodiments or a form in which the embodiments are combined with each other as appropriate.

For example, in the stator blade 9 according to some embodiments, the recess portion 23, the guide groove 28, and the through-hole 27 are provided in the blade wall 24 on the pressure side 22, and the liquid phase guidance member 30 is disposed therein. However, the recess portion 23, the guide groove 28, and the through-hole 27 may be provided in the blade wall 24 on a back side 29, and the liquid phase guidance member 30 may be disposed therein.

For example, contents described in each of the above-described embodiments are understood as follows.

(1) A steam turbine blade (stator blade 9) according to at least one embodiment of the present disclosure includes a recess portion 23 that is formed on a surface of a blade (blade shape portion 21), a liquid phase guidance member 30 that is inserted into or fixed to the recess portion 23, with recesses and projections (projecting portion 31 and groove 33 or hydrophilic processed surface 34) formed on a surface thereof to guide liquid-phase water to a trailing edge 21T side of the blade (blade shape portion 21), or that is applied with a hydrophilic coating 35, and a through-hole 27 for taking in the liquid-phase water guided by the liquid phase guidance member 30 to an inner space 25 of the blade (blade shape portion 21).

According to the configuration of the above (1), since the liquid-phase water can be guided to the through-hole 27 by the liquid phase guidance member 30, it is possible to narrow a range where the through-hole 27 is provided. As a result, it is possible to efficiently remove the liquid-phase water adhering to the surface of the blade (stator blade 9) or of the liquid phase guidance member 30 while reducing the cost of providing the through-holes 27 in the relatively large blade (stator blade 9).

(2) In some embodiments, in the configuration of the above (1), a height of a projecting portion (projecting portion 31 or hydrophilic processed surface 34) of the recesses and projections (projecting portion 31 and groove 33 or hydrophilic processed surface 34) in a blade thickness direction, or a height of a surface 30*a* of the liquid phase guidance member 30 on which the hydrophilic coating 35 is applied in the blade thickness direction may be the same as a height of a blade surface 22*a* of the blade (blade shape portion 21) in the blade thickness direction.

According to the configuration of the above (2), it is possible to efficiently guide the liquid-phase water.

(3) In some embodiments, in the configuration of the above (1) or (2), a liquid phase guidance member 30A may be a press molded product.

According to the configuration of the above (3), it is possible to reduce the manufacturing cost of the liquid phase guidance member 30A.

(4) In some embodiments, in the configuration of any one of the above (1) to (3), a region where the recesses and projections (projecting portion 31 and groove 33 or hydrophilic processed surface 34) are formed or a region where the hydrophilic coating 35 is applied may be a part of a region in a blade height direction in the liquid phase guidance member 30.

According to the configuration of the above (4), the range in which the liquid-phase water is collected can be changed as appropriate, and thus it is easy to correspond to the difference in the distribution condition of the liquid-phase water in the blade (blade shape portion 21).

(5) In some embodiments, in the configuration of any one of the above (1) to (4), the recess portion 23 may include a first recess portion 23A and a second recess portion 23B formed at a position different from the first recess portion 23A in a blade height direction. The liquid phase guidance member 30 may include a first liquid phase guidance member 301 that is inserted into and fixed to the first recess portion 23A and a second liquid phase guidance member 302 that is inserted into and fixed to the second recess portion 23B.

According to the configuration of the above (5), even in a case where the liquid phase guidance member 30 is provided in a relatively wide range in the blade height direction, it is possible to relatively narrow the range where the through-holes 27 are provided.

(6) In some embodiments, in the configuration of the above (5), a part of a region of the first liquid phase guidance member 301 and a part of a region of the second liquid phase guidance member 302 may overlap each other in the blade height direction.

According to the configuration of the above (6), it is possible to efficiently collect the liquid-phase water in a relatively wide range in the blade height direction.

(7) In some embodiments, in the configuration according to any one of the above (1) to (6), the above-described recesses and projections (projecting portion 31 and groove 33 or hydrophilic processed surface 34) may be formed by a plurality of grooves 33 extending from a leading edge 21L of the blade (blade shape portion 21) to a trailing edge 21T.

According to the configuration of the above (7), it is possible to efficiently collect the liquid-phase water in the through-holes 27 through the plurality of grooves 33.

(8) In some embodiments, in the configuration of the above (7), at least one of the plurality of grooves 33 may be formed in a linear shape when viewed from the blade thickness direction.

According to the configuration of the above (8), it is possible to simplify the configuration of the liquid phase guidance member 30A.

(9) In some embodiments, in the configuration of the above (7) or (8), at least one of the plurality of grooves 33 may be formed in a curved shape in at least a part of a region when viewed from the blade thickness direction.

According to the configuration of the above (9), for example, since the groove 33 can be formed in a direction in which the liquid-phase water tends to flow by being affected by the flow of the steam inside the steam turbine 1, it is possible to efficiently collect the liquid-phase water.

(10) In some embodiments, in the configuration of any one of the above (7) to (9), an interval L between two grooves 33 adjacent to each other among the plurality of grooves 33 in the blade height direction may be different between a region on a leading edge 21L side and a region on the trailing edge 21T side of the blade (blade shape portion 21).

According to the configuration of the above (10), the range in which the liquid-phase water is collected can be changed as appropriate by adjusting the interval L between the grooves 33 as appropriate, and thus it is easy to correspond to the difference in the distribution condition of the liquid-phase water in the blade (blade shape portion 21).

(11) In some embodiments, in the configuration of any one of the above (7) to (10), in at least one of the plurality of grooves 33, a width W of the groove 33 may be different between a region of a leading edge 21L of the blade (blade shape portion 21) and a region on the trailing edge 21T side.

According to the configuration of the above (11), the range in which the liquid-phase water is collected can be changed as appropriate by adjusting the width W of the groove 33 as appropriate, and thus it is easy to correspond to the difference in the distribution condition of the liquid-phase water in the blade (blade shape portion 21).

(12) A steam turbine 1 according to at least one embodiment of the present disclosure includes the steam turbine blade (stator blade 9) having the configuration of any one of the above (1) to (11).

According to the configuration of the above (12), it is possible to efficiently remove the liquid-phase water adhering to the surface of the blade (stator blade 9) or of the liquid phase guidance member 30 while reducing the cost of providing the through-hole 27 in the relatively large blade (stator blade 9).

(13) A method for manufacturing a steam turbine blade according to at least one embodiment of the present disclosure is a method for manufacturing a steam turbine blade, the method including a step S20 of forming a recess portion 23 on a surface of a blade (blade shape portion 21), a step S10 of forming a through-hole 27 that communicates with an inner space 25 of the blade (blade shape portion 21) at a position on a trailing edge 21T side of the blade (blade shape portion 21) with respect to the recess portion 23, and a step S30 of inserting and fixing a liquid phase guidance member 30 in which recesses and projections (projecting portion 31 and groove 33 or hydrophilic processed surface 34) for guiding liquid-phase water to the trailing edge 21T side of the blade are formed on a surface or a hydrophilic coating 35 is applied, into the recess portion 23.

According to the method of the above (13), since the liquid-phase water can be guided to the through-hole 27 by the liquid phase guidance member 30, it is possible to narrow a range where the through-hole 27 is provided. As a result, it is possible to provide a blade (stator blade 9) that is capable of efficiently removing the liquid-phase water adhering to the surface of the blade (stator blade 9) or of the liquid phase guidance member 30 while reducing the cost of providing the through-holes 27 in the relatively large blade (stator blade 9).

REFERENCE SIGNS LIST

1: steam turbine

9: stator blade

21: blade shape portion
21L: leading edge
21T: trailing edge
23: recess portion
23A: first recess portion
23B: second recess portion
24: blade wall
25: inner space
27: through-hole
28: guide groove
30, 30A, 30B, 30C: liquid phase guidance member
31: projecting portion
33: groove
34: hydrophilic processed surface
35: hydrophilic coating
301: first liquid phase guidance member
302: second liquid phase guidance member

The invention claimed is:

1. A steam turbine blade comprising:

a recess portion that is formed on a surface of a blade and is separated from an inner space of the blade by a blade wall of the blade;

a liquid phase guidance member that is inserted into and fixed to the recess portion and has a surface on which recesses and projections for guiding liquid-phase water to a trailing edge side of the blade are formed, or on which a hydrophilic coating is applied, wherein a side of the liquid phase guidance member opposite to the surface of the blade is supported by the blade wall; and a through-hole for taking in the liquid-phase water guided by the liquid phase guidance member into the inner space of the blade.

2. The steam turbine blade according to claim 1, wherein a height of a projecting portion of the recesses and projections in a blade thickness direction or a height of the surface of the liquid phase guidance member on which the hydrophilic coating is applied in the blade thickness direction is the same as a height of a blade surface of the blade in the blade thickness direction.

3. The steam turbine blade according to claim 1, wherein the liquid phase guidance member is a press molded product.

4. The steam turbine blade according to claim 1, wherein a region where the recesses and projections are formed or a region where the hydrophilic coating is applied is a part of a region of the liquid phase guidance member in a blade height direction.

5. The steam turbine blade according to claim 1, wherein the recess portion includes a first recess portion and a second recess portion formed at a position different from a position of the first recess portion in a blade height direction, and the liquid phase guidance member includes a first liquid phase guidance member that is inserted into and fixed to the first recess portion, and a second liquid phase guidance member that is inserted into and fixed to the second recess portion.

6. The steam turbine blade according to claim 5, wherein a part of a region of the first liquid phase guidance member and a part of a region of the second liquid phase guidance member overlap each other in the blade height direction.

7. The steam turbine blade according to claim 1, wherein the recesses and projections are formed by a plurality of grooves extending from a leading edge to a trailing edge of the blade.

8. The steam turbine blade according to claim 7, wherein at least one of the plurality of grooves is formed in a linear shape when viewed from a blade thickness direction.

9. The steam turbine blade according to claim 7, wherein at least one of the plurality of grooves is formed in a curved shape in at least a part of a region when viewed from a blade thickness direction.

10. The steam turbine blade according to claim 7, wherein an interval between two adjacent grooves among the plurality of grooves in a blade height direction is different between a region on a leading edge side and a region on the trailing edge side of the blade.

11. The steam turbine blade according to claim 7, wherein at least one of the plurality of grooves has a width of the groove that is different between a region on a leading edge side and a region on the trailing edge side of the blade.

12. A steam turbine comprising:

the steam turbine blade according to claim 1.

13. A method for manufacturing a steam turbine blade, the method comprising:

a step of forming a recess portion on a surface of the blade, the recess portion being separated from an inner space of the blade by a blade wall of the blade;

a step of forming a through-hole communicating with the inner space of the blade at a position on a trailing edge side of the blade with respect to the recess portion; and a step of inserting and fixing a liquid phase guidance member into the recess portion, the liquid phase guidance member having a surface on which recesses and projections for guiding liquid-phase water to the trailing edge side of the blade are formed, or on which a hydrophilic coating is applied, wherein the side of the liquid phase guidance member opposite to the surface of the blade is supported by the blade wall.

* * * * *